United States Patent [19]

Enggasser et al.

[11] Patent Number: 5,264,282
[45] Date of Patent: Nov. 23, 1993

[54] POLYAMIDE FILAMENT, PROCESS FOR PRODUCING IT AND ITS USE

[75] Inventors: Josiane Enggasser, Emmenbrücke, Switzerland; Roland Stählin, Lyon, France

[73] Assignee: Rhone-Poulenc Viscosuisse SA, Emmenbrücke, Switzerland

[21] Appl. No.: 847,074

[22] PCT Filed: Aug. 21, 1991

[86] PCT No.: PCT/CH91/00177
§ 371 Date: Apr. 7, 1992
§ 102(e) Date: Apr. 7, 1992

[87] PCT Pub. No.: WO92/03603
PCT Pub. Date: Mar. 5, 1992

[30] Foreign Application Priority Data

Aug. 27, 1990 [CH] Switzerland .................. 2777/90-3

[51] Int. Cl.$^5$ ................................. D07G 3/00
[52] U.S. Cl. ....................... 428/364; 528/324; 525/432; 428/370; 428/372
[58] Field of Search .............. 528/324; 525/432; 428/364, 370, 372, 374

[56] References Cited

U.S. PATENT DOCUMENTS

| | | | |
|---|---|---|---|
| 3,489,641 | 1/1970 | Harcolinski et al. | 428/370 |
| 3,511,749 | 5/1970 | Ogata et al. | 428/374 |
| 3,629,053 | 12/1971 | Suita et al. | 428/374 |
| 3,852,226 | 12/1974 | Sprauer | 528/324 |
| 4,471,088 | 9/1984 | Chiba et al. | 528/324 |
| 4,559,196 | 12/1985 | Kobsa | 264/168 |
| 4,729,923 | 3/1988 | Windley | 428/372 |

FOREIGN PATENT DOCUMENTS

| | | |
|---|---|---|
| 0159635 | 12/1985 | European Pat. Off. . |
| 0245072 | 5/1987 | European Pat. Off. . |
| 1304494 | 9/1971 | United Kingdom . |

*Primary Examiner*—Patrick J. Ryan
*Assistant Examiner*—Newton O. Edwards
*Attorney, Agent, or Firm*—Michael J. Striker

[57] ABSTRACT

The process for making a polyamide filament having thermal and mechanical properties close to those of nylon 66 but without spherulites includes concentrating an aqueous solution of adipic acid-hexamethylenediamine salt containing from 1 to 10% by weight of ϵ-caprolactam and from 1 to 15% by weight of PA 6.HHT to form a condensed mixture; polycondensing the condensed mixture to form a polycondensed mass; and melt-spinning the polycondensed mass to form the polyamide filament. The process parameters are controlled to produce a polyamide filament consisting essentially of at least 80% by weight nylon 66 monomer, 1 to 10% by weight nylon 6 monomer and 1 to 15% by weight PA 6.HHT.

9 Claims, No Drawings

POLYAMIDE FILAMENT, PROCESS FOR PRODUCING IT AND ITS USE

BACKGROUND OF THE INVENTION

The invention relates to a polyamide filament comprising at least 80% by weight of nylon 66, a process for producing it and its use.

Nylon 66 has excellent thermal-mechanical properties It is therefore highly suitable, inter alia, for producing filaments via melt spinning However, as a characteristic disadvantage of this processing of nylon 66 polymer it must be borne in mind that a phenomenon known as low luster or LL sensitivity is observed It is due to spherulite inhomogeneities which, in the course of the spinning or spin-drawing process, are formed in the cooling filament underneath the spinnerette The consequences thereof are in some instances strongly adverse effects in particular on the course of spinning and drawing and on the mechanical properties. The LL phenomenon arises in particular at high filament deniers, which cool down in the quenching chamber more slowly than thin filaments LL can be triggered artificially by lowering the melt temperature in the region of the point of exit from the spinnerette (so-called temperature LL). By this method it is possible to examine various measures, for example chemical modification to the nylon 66 matrix, in respect of their suitability for reducing LL sensitivity or spherulite formation.

The prevention of spherulite formation has long been of intense interest For instance, US-A-4 919 874 discloses a process for producing nylon filaments by mixing nylon 66 with nylon 6 and copolymerizing hexamethyleneadipamide with ϵ-caprolactam. Spherulite formation is encouraged by adding a water-soluble inorganic calcium salt. The purpose is not to prevent but to produce a large number of very small spherulites in very homogeneous distribution. In addition to the fact that such nylon 66 filaments are still full of spherulites, a further disadvantage is the lower melting point which has to be accepted as a result of the addition of ϵ-caprolactam. Nor can the sole addition of caprolactam solve the LL problem, since the influence of the addition of ϵcaprolactam within a co-content range of 1-3% by weight on LL sensitivity is low.

Increasing the caprolactam content to above about 3% has the disadvantage that the melting and softening point is lowered to such an extent that further processibility, specifically texturability, is impaired. Besides, high caprolactam concentrations also have an extremely adverse effect on the thermo-mechanical properties, for example on the crimp modulus.

An addition of less than 1.0% by weight of caprolactam compared with nylon 66 containing no addition does not show any significant reduction in LL proneness.

The numerous attempts undertaken for the purpose of preventing spherulite formation and thus the LL effect also include increasing the spinnerette temperature, shortening the residence time of the melt and frequent spinnerette replacement. However, none of the numerous measures has had a satisfactory result.

SUMMARY OF THE INVENTION

It is therefore an object of the present invention to produce a polyamide filament based on nylon 66 that, on the one hand, by virtue of the substantial prevention of spherulite formation, can be highly efficiently produced and further processed and that, on the other, comes very close to the level of unmodified nylon 66 in respect of thermal and mechanical yarn properties.

It is a further object to provide a process for spherulite-free production of nylon 66 POY.

A further object of the invention is to provide a polymer that is satisfactorily spinnable at take-off speeds above 3000 m/min while retaining the most important yarn and processing properties.

According to the invention, the object is achieved by claim 1 when the copolymer contains 1-10% by weight of nylon 6 monomer units and 1-15% by weight of monomer units of PA 6. HHT, made from hexahydroterephthalic acid (HHT) and hexamethylenediamine (HMD).

The combined addition of 6.HHT salt, i.e. the salt formed by reacting hexamethylenediamine with hexahydroterephthalic acid and ϵ-caprolactam to nylon 66 has surprisingly resulted in a good anti-LL effect while at the same time substantially preserving the other polymer or yarn properties.

Surprisingly, the so modified polymer showed only low strength losses under temperature LL, which is prevented for a longer time on reducing the spinnerette temperature and only breaks through at lower temperatures. This consequently increases the reliability of the spinning process to a considerable extent.

It is advantageous for the adipic acid-hexamethylenediamine salt to be concentrated together with the comonomers ϵ-caprolactam and hexahydroterephthalate (HHT), the mixture polycondensed and the polymer melt-spun.

It is expedient to add the hexahydroterephthalic acid to the adipic acid-hexamethylenediamine salt in the form, of a solution of the 6.HHT salt in water, the initial concentration of hexamethylenediamine (HMD) and hexahydroterephthalic acid (HHT) of the solution being cleverly chosen so that the salt concentration is between 25 and 65% by weight, preferably between 45 and 50% by weight.

The melt or crystallization point are determined by DSC analysis (Mettler TA 3000). The following program is employed:

---

50° C.-(20K/min) → 290° C.
290° C.-(20K/min) → 150° C. (determined of crystallization point)
150° C.-(10K/min) → 290° C. (determined of melting point)

---

The invention will now be illustrated with reference to examples.

EXAMPLE 1: SYNTHESIS OF 6.HHT SALT (48% AQUEOUS SOLUTION)

First 15.77 mol (1.83 kg) of HMD are dissolved in 5 l of water in about 10 min. To the solution is gradually added 15.50 mol (2.67 kg) of HHT and mixed in until a clear solution results.

In the course of this process the temperature rises to about 60°-70° C. and is maintained at 70° C. ± 1° C. for not more than 1 h and directly admixed to the adipic acid-hexamethylene diamine salt—in each instance under exclusion of oxygen.

EXAMPLE 2: POLYCONDENSATION OF COPOLYAMIDE CONTAINING 3% EACH OF CAPROLACTAM AND 6.HHT SALT

The autoclave is charged with the following substances:

| | |
|---|---|
| adipic acid-hexamethylene diamine salt - in each instance. | 2044 kg (as 52% aqueous solution) |
| Caprolactam: | 58.5 kg (as 50% aqueous solution) |
| 6.HHT salt: | 61 kg (as 48% aqueous solution) |
| Acetic acid: | 4.14 kg (as 25% aqueous solution) |

This solution is concentrated from 52 to 74 m/m %. Then the pressure is increased to 19 bar in the course of about 25 min while the temperature is raised to 220°.

After 19 bar has been reached the addition takes place of a delusterant (9.71 l of a 25% TiO$_2$ suspension in water).

The distillation is continued at constant pressure (19 bar) until the temperature has reached 238° C. Then the pressure is reduced from 19 to 1 bar (atmospheric) in the course of 85 min while the temperature rises to 267° C. Before discharge and granulation of the polymer material the polycondensation reaction is terminated under atmospheric conditions over a period of 30 min. The resulting polymer has the following properties: Melting point: 260° C. Crystallization point: 217° C.

The polymer properties of this copolyamide example are summarized in Table 1.

EXAMPLES 3-6

Spinning of Copolyamides

The reference and the inventively modified polymers were spun into filaments by the customary POY process which is characterized by the following data:

| | |
|---|---|
| Throughput: | 84.0 g/min |
| Melt pressure: | about 265 bar |
| Spinning pack temperature: | 295° C. |
| Winding speed: | 4200 m/min |
| Denier: | 100 (78) f 20 |

The yarns obtained with this setting were used as comparative material (see Table 2: LL assessment = "OK"). Thereafter the melt temperature was reduced, by lowering the pack temperature, until visual assessment revealed that the LL effect had reached the maximum level (see Table 2: LL assessment = "xxx").

TABLE 2

Overview of yarn properties under temperature LL

| Ex. | Spinnerette temperature °C. | LL[1] | Tenacity CN/tex | % tenacity | Elongation at break % | U % | Melting point (°C.)[2] | Crystallization point (°C.)[2] |
|---|---|---|---|---|---|---|---|---|
| 2 | 281.6 | OK | 35.5 | 100.0 | 78.7 | 0.74 | 258.6 | 230.8 |
|   | 273.0 | * | 34.6 | 97.54 | 79.1 | 0.72 | | |
|   | 271.2 | *** | 34.2 | 96.3 | 79.7 | 0.71 | | |
| 3 | 281.9 | OK | 35.4 | 100.0 | 75.5 | 0.57 | 256.5 | 228.2 |
|   | 273.6 | *** | 27.3 | 77.1 | 79.0 | 0.95 | | |
| 4 | 281.7 | OK | 37.6 | 100.0 | 74.8 | 0.67 | 256.6 | 229.4 |
|   | 273.6 | ** | 35.9 | 95.5 | 75.7 | 1.30 | | |
|   | 271.6 | *** | 35.5 | 94.4 | 76.4 | 1.26 | | |

[1] Visual assessment of LL
[2] Measured on filament

Extrapolation was used to determine the value of the spinnerette temperature at which the LL effect was observed for the first time: see Table 3.

TABLE 3

| Example | Temperature °C. LL onset | *** LL |
|---|---|---|
| 2 | 274.3 | 271 |
| 3 | 280.8 | 274 |
| 4 | 279.4 | 272 |

Tables 2 and 3 clearly reveal the advantages of the modification according to the present invention, based on a combination of the comonomers caprolactam and hexahydroterephthalic acid:

- very low temperature limit for the onset of the LL phenomenon and hence the best reliability concerning spinning processes.
- very small loss in respect of mechanical properties for a given spinnerette temperature.
- very small difference relative to unmodified reference PA 66 in respect of thermal properties (melting/crystallization point).

TABLE 1

Chemical analyses on polymer and on filament

| Ex. | Additions in CP wt. % | Wt. % in 6.HHT | RV Polymer | RV Filament | AEG mol/t Polymer | AEG mol/t Filament | CEG mol/t Polymer | CEG mol/t Filament | Melting point[1] | Crystallization point[1] |
|---|---|---|---|---|---|---|---|---|---|---|
| 2 | 1 | — | 40.6 | 42.3 | 48.4 | 48.0 | 70.1 | 64.3 | 261.5° C. | 219.0 |
| 3 | 2.5 | — | 40.8 | 42.5 | 45.3 | 45.7 | 73.3 | 67.3 | 259.0° C. | 216.5 |
| 4 | 3 | 3 | 38.2 | 38.7 | 49.9 | 49.3 | 67.7 | 62.1 | 260.0° C. | 217.0 |
| 5 | 3 | 2 | 42.9 | — | 46.5 | — | 60.9 | — | 257.7° C. | 215.2 |
| 6 | 5 | 10 | 41.8 | — | 41.1 | — | 69.5 | — | 259.0° C. | 219.0 |

CP: ε-caprolactum
RV: relative viscosity
AEG: amino end groups
CEG: carboxyl end groups
6.HHT: salt of HMD and HHT
[1] measured on granules

We claim:

1. A polyamide filament consisting essentially of a copolymer, said copolymer consisting of at least 80% by weight nylon 66 monomer units, from 1 to 10% by weight nylon 6 monomer units, and from 1 to 15% by weight PA 6.HHT monomer units, from the hexahydroterephthalic acid and hexamethylenedimaine.

2. A process for making a polyamide filament comprising the steps of:
   a. concentrating an aqueous solution of adipic acid-hexamethylenediamine salt containing from 1 to 10% by weight of ε-caprolactam and from 1 to 15% by weight of a salt of PA 6.HHT being made from hexahydroterephthalic acid and hexamethylenediamine to form a condensed mixture;
   b. polycondensing the condensed mixture; and
   c. melt-spinning the polycondensed mass to form the polyamide filament.

3. A process as defined in claim 2, wherein the aqueous solution is made, in part, from another aqueous solution containing from 25 to 65% by weight of the salt of hexhydroterephthalic acid and hexamethylenediamine.

4. A process as defined in claim 2, wherein said melt-spinning is performed at spinning speeds greater than 2800 m/min so as to form said polyamide filament.

5. A process as defined in claim 2, wherein said aqueous solution contains 1 to 3% by weight of said nylon 6 monomer units.

6. A process as defined in claim 2, wherein said aqueous solution contains 1 to 3% by weight of said PA 6.HHT monomer units.

7. A process as defined in claim 2, wherein said polycondensed mass has a melting point from 256.6° to 258.6° C.

8. A process as defined in claim 2, wherein said polycondensed mass has a melting point of 256.6° C., said nylon 6 monomer units are present in said aqueous solution in an amount equal to 3% by weight and said PA 6.HHT is present in said aqueous solution in an amount equal to 3% by weight.

9. A process as defined in claim 2, wherein said concentrating comprises distilling at pressures up to 19 bar and temperatures up to 238° C.

* * * * *